United States Patent [19]

Uber et al.

[11] 4,287,313

[45] Sep. 1, 1981

[54] BLOCK COPOLYMERS OF CONJUGATED DIENES AND LACTONES AS MODIFIERS OF UNSATURATED POLYESTERS

[75] Inventors: Raymond F. Uber; Clifford W. Childers; Floyd E. Naylor, all of Bartlesville, Okla.

[73] Assignee: Phillips Petroleum Co., Bartlesville, Okla.

[21] Appl. No.: 27,123

[22] Filed: Apr. 4, 1979

[51] Int. Cl.³ .......................... C08L 9/00; C08L 9/06; C08L 67/04; C08L 67/06

[52] U.S. Cl. ...................................... 525/91; 525/44; 525/171

[58] Field of Search ...................... 525/44, 91, 171; 260/40 R

[56] References Cited

U.S. PATENT DOCUMENTS

| | | | |
|---|---|---|---|
| 3,549,586 | 12/1970 | Smith et al. | 260/40 |
| 3,639,519 | 2/1972 | Hsieh et al. | |
| 3,649,716 | 3/1972 | Childers et al. | |
| 3,764,639 | 10/1973 | Hsieh et al. | |
| 3,989,769 | 11/1976 | Bonnington | |
| 4,016,221 | 4/1977 | Kudo et al. | 260/873 |
| 4,020,036 | 4/1977 | South | |

OTHER PUBLICATIONS

Ito, "Propagation—Caprolactone—Oligomers" Macromolecules vol. 11, No. 1, Jan.-Feb. 1978 pp. 68-72.
Ito, "Equilibrium—Caprolactone" Macromolecules; vol. 10; No. 4 Jul.-Aug. 1977 pp. 821-824.

Primary Examiner—John C. Bleutge
Assistant Examiner—A. H. Koeckert

[57] ABSTRACT

A thermosettable composition comprising (1) an unsaturated polyester, (2) a block copolymer of a lactone, a conjugated diene and, optionally, a monovinylarene, and (3) a vinyl monomer is provided which shows improved compatibility and stability over a composition in which the block copolymer does not contain a polylactone block.

29 Claims, No Drawings

BLOCK COPOLYMERS OF CONJUGATED DIENES AND LACTONES AS MODIFIERS OF UNSATURATED POLYESTERS

FIELD OF THE INVENTION

This invention relates to improved unsaturated polyester compositions modified by a polymer of a conjugated diene. It further relates to unsaturated polyester compositions containing a copolymer of a lactone, a conjugated diene and, optionally, a monovinylarene.

DESCRIPTION OF THE PRIOR ART

It is known in the art to modify unsaturated polyesters with a conjugated diene-monovinylarene rubber to impart to the fabricated product improved impact resistance, smooth surface, paintability, and uniformity of pigmentation. A problem which is frequently encountered with these modified polyester compositions is phase separation which is caused by the incompatibility of the polyester and rubber and results in a non-uniform product which exhibits many of the deficiencies of the unmodified polyester.

It is thus an object of this invention to provide a thermosettable polyester composition, having the improved properties imparted by a polymer of a conjugated diene, which is not subject to the problem of incompatibility and phase separation of the polyester and rubber components.

SUMMARY OF THE INVENTION

According to the invention, there is provided a composition comprising (1) an unsaturated polyester, (2) a block copolymer of a conjugated diene, a lactone and, optionally, a monovinylarene, and (3) a vinyl monomer. The addition of at least one lactone block to the conjugated diene polymer causes the polyester and rubber components of the blend to be more compatible and less likely to undergo phase separation.

DETAILED DESCRIPTION OF THE INVENTION

The lactone block copolymers suitable for use in the composition of the invention are copolymers of a lactone and a conjugated diene, and optionally a monovinylarene. Lithium-based compounds are used as polymerization initiators. The lactone copolymers of the invention can be represented by the formula $A(D)_y$ where A and D are polymer segments and y is an integer from 1 to 4. A can be linear or branched in structure and normally will contain a residue of the polymerization initiator. When a monolithium initiator is used, the lactone copolymers can be represented at least in part by the formula A-D, where A is a polymer segment comprising one or more polymer blocks (including homopolymer, random, and random-tapered blocks) of one or more conjugated dienes with or without one or more monovinylarenes, and D is a polymer segment comprising one or more polymer blocks of one or more lactones. When the A segment comprises a copolymer of conjugated dienes and monovinylarenes, the conjugated diene to monovinylarene weight ratio can range from about 99:1 to about 1:99.

Following the formation of the A block, the lactone or mixture of lactones can be added directly to the polymerization mixture containing the preformed living polymer of the form A-Li or, preferably, the lactone or mixture of lactones can be added after the living polymer is reacted with a capping agent such as an oxirane, aldehyde, epoxyaldehyde, polyaldehyde, ketone or epoxyketone, as described in U.S. Pat. Nos. 3,585,257 and 3,639,519, the disclosures of which are hereby incorporated by reference. The resulting polymer will contain a residue of the capping agent used. Because of its availability and lack of coupling activity with the living polymer, propylene oxide is the preferred capping agent for the copolymer of this invention.

It is essential that the conjugated diene monomer and monovinylarene monomer, when used, be polymerized first because the polymer-Li structure, or the polymer-O-Li structure of the capped or coupled conjugated diene block (or conjugated diene-monovinylarene block), is believed to serve as the catalyst for the polymerization of the lactone monomer. If the lactone monomer is polymerized first, the lactone polymer-O-Li structure does not provide a reactive site for the subsequent polymerization of the conjugated diene or monovinylarene, and the block copolymer cannot be formed.

The block copolymers of this invention can also be prepared in a multi-step process in which a conjugated diene, or conjugated diene and monovinylarene, is polymerized to essentially quantitative conversion using the lithium-containing initiator. Each succeeding step can then involve the addition of a different conjugated diene or monovinylarene which is polymerized to essentially quantitative conversion so that a block copolymer having two or more blocks is formed before the lactone is added. The addition and polymerization of a lactone, mixture of lactones, or successive increments of different lactones are the final steps in the multi-step polymerization process. It is essential in this process also that the conjugated dienes and monovinylarenes be polymerized first for the reason discussed above.

Where y is 2 to 4 (i.e. in those cases where the lithium initiator has 2 to 4 reactive sites) the use of a capping agent which is a coupling agent should be avoided. However, a capping agent should be used to avoid coupling by the lactone monomer. In general, coupling should be minimized to the extent necessary to avoid undesirably high viscosity of the unsaturated polyester/lactone copolymer/vinyl monomer composition.

It is currently believed that, where y is 1, if the capping agent used is a coupling agent for the preformed A-Li polymer, as is the case, for example, for a compound having two or more oxirane groups, a polyaldehyde or an epoxyketone, or if no capping agent is added before the lactone (which itself can act as a coupling agent) is added directly to the preformed, non-capped living polymer, there may result after termination a polymer having the formula $(A)_n Z(H)_n$, where A is as described previously, Z is the residue from one molecule of the capping-coupling agent or one molecule of the lactone monomer, and n is an integer having a maximum value equal to the number of living polymer segments A which can combine with the lactone monomer or the chosen capping-coupling agent. When Z is derived from the lactone monomer, n will have a maximum value of 2.

The precursor of the coupled product $(A)_n Z(H)_n$ prior to termination of the polymerization reaction has the general structure $(A)_n Z(Li)_n$ and can initiate the polymerization of lactone monomer to give a branched polymer having up to n polyactone branches. After termination of the polymerization reaction, this branched polymer can be represented by the formula $(A)_nZ(D)_m(H)_{n-m}$, where D is a block polylactone as described previously and m is an integer from 1 to and including n. There is also the possibility that a small amount of lactone homopolymer may be formed during polymerization as a result of base-catalyzed chain scission. Thus, the polymerized lactone composition may consist of one or more polymers of the structures A-D, $(A)_nZ(H)_n$, $(A)_nZ(D)_m(H)_{n-m}$, and D.

As used in this application, the formula $A-D)_y$ is intended to encompass copolymers in which some coupling of the type described above has taken place.

The copolymers of a conjugated diene and a lactone, and optionally a monovinylarene, which have improved compatibility with unsaturated polyester resins preferably are predominantly of the structure A-D. They are preferably prepared using a recipe in which the lactone or mixture of lactones constitutes about 4 to 90 weight percent of the total monomers, preferably about 8 to 50 weight percent, in order to provide a lactone polymer with good compatibility with the unsaturated polyester resin. It is estimated that, using the preferred recipe, the weight percent polymerized lactone in the block copolymer will range from about 2 to about 40 weight percent of the total polymerized monomers. When the A segment of the copolymer comprises a copolymer of conjugated dienes and monovinylarenes, the conjugated diene to monovinylarene weight ratio preferably ranges from about 99:1 to about 50:50. The molecular weight of the lactone copolymers used in the composition of the invention, calculated on the basis of millimoles of initiator per 100 g of total monomer charge, should be broadly from about 5,000 to 1,000,000, preferably 20,000 to 500,000, and more preferably 35,000 to 150,000.

Conjugated dienes containing 4 to about 12 carbon atoms per molecule and monovinylarenes containing 8 to about 12 carbon atoms per molecule can be used for the preparation of the polymerized lactone compositions used in this invention. For example, suitable conjugated dienes include 1,3-butadiene, isoprene, piperylene, 6-phenyl-1,3-hexadiene, and mixtures of these. Examples of suitable monovinylarenes include styrene, α-methylstyrene, 4-methylstyrene, 4-isopropylstyrene, 2,4-dimethylstyrene, 1-vinylnaphthalene, 2-vinylnaphthalene, and mixtures of these.

Lactone monomers which can be employed to prepare the lactone polymers for use in this invention can be represented by the formula

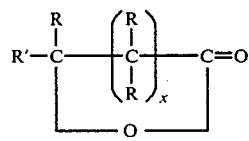

in which each R is selected independently from hydrogen, alkyl, cycloalkyl alkenyl, cycloalkenyl and aryl, and combinations thereof such as alkaryl and aralkyl; R' is selected from R, hydrogen, and a radial of the formula

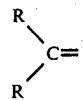

(when R' is the specified radical, no R is attached to the carbon atom to which the radical is attached); the total number of carbon atoms in all the R and R' substituents is within the range 0 to about 12; and x is 1, 3 or 4. Examples of lactones which can be used include beta-propiolactone, delta-valerolactone, epsilon-caprolactone, and lactones corresponding to the following acids: 2-methyl-3-hydroxypropionic acid, 3-hydroxynonanoic acid, 2-dodecyl-3-hydroxypropionic acid, 2-(1-naphthyl)-3-hydroxypropionic acid, 2-butyl-3-cyclohexyl-3-hydroxypropionic acid, 3-hydroxypentadecanoic acid, 2-(2-methylcyclopentyl)-3-hydroxypropionic acid, 2-o-tolyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-(2-cyclohexylethyl)-5-hydroxyvaleric acid, 2-(2-phenylethyl)-4-propyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-(3-phenylpropyl)-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, and 2,2-dipropenyl-5-hydroxy-5-heptenoic acid. Mixtures of lactones can be employed.

The initiator used can be any lithium-containing polymerization initiator suitable for conjugated diene and for monovinylarene polymerization. The preferred initiators are those which correspond to the general formula $R''(Li)_y$, in which $R''$ is a hydrocarbon radical selected from the group consisting of aliphatic, cycloaliphatic, and aromatic radicals and combinations thereof, and y is an integer from 1 to 4, inclusive. The $R''$ group has a valence equal to y and preferably contains from 1 to about 20 carbon atoms, although it is possible to use high molecular weight compounds. Examples of suitable lithium-containing compounds within the scope of the above formula include methyllithium, isopropyllithium, n-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3decene, 1,4-dilithiobenzene, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, and 1,2,3,5-tetralithio-4-hexylanthracene. Other suitable initiators include reaction products between the compounds of the formula $R''(Li)_y$ as disclosed above and one of a divinylaromatic or a trivinylaromatic compound containing 1 or 2 benzene rings or alkyl substituted benzene rings, the total of the alkyl substituents or any di- or trivinylaromatic compound not exceeding 12 carbon atoms. Examples of suitable vinylaromatic compounds for reaction with the organolithium initiator include 1,3-divinylbenzene, 1,3,5-trivinylnaphthyalene, and 4,4'-divinylbiphenyl.

In the preparation of the block copolymers of the invention having more than two separate polymer segments (a copolymer of the form A(D)$_y$, where y=2, 3 or 4, A and D are as defined previously), those lithium initiators which contain more than one active lithium atom per molecule are suitable. These initiators provide a central polymer segment of the conjugated diene and, optionally, monovinylarene having attached to each of the terminal ends of the polymer segment an active Li atom. Initiators such as that formed by reacting lithium with methylnaphthalene and isoprene and solubilizing the reaction product with butadiene (LIMI-B) and catalysts such as a lithium-stilbene adduct are suitable.

The initiator level for the polymerization can vary widely but is generally in the range of from about 0.1 to about 20 gram millimoles per 100 grams of the total monomers to be polymerized, i.e., all the conjugated diene, monovinylarene, and lactone monomers. The initiator level is generally not changed when the conjugated dienes and monovinylarenes have been polymerized to the desired extent and the lactone or lactones are added for polymerization. Thus, the initiator level for the polymerization of the conjugated diene and monovinylarene is generally the level for the entire polymerization process. Generally, the amount of initiator or initiators used in making the block copolymer of the invention will be that which is sufficient to effect the polymerization of substantially all monomers charged.

For preparing copolymers of lactones and conjugated dienes suitable for modifying unsaturated polyesters, it is preferred to use initiators as described above but in which y is limited to 1 or 2 in order that a linear polymer is the predominant lactone-containing polymer. Such linear, uncoupled polymers form an unsaturated polyester/lactone copolymer/vinyl monomer composition having relatively low viscosity, a factor which can be important in the mixing and fabricating of thermosettable compositions containing rubber-modified unsaturated polyester resins.

Various substances are known to be detrimental to the initiator and the living polymer of the invention. These detrimental substances include carbon dioxide, oxygen and water. It is highly desirable, therefore, that the reactants, the polymerization apparatus, and the polymerization reaction mixture be substantially free of these materials as well as any other materials which can deactivate any reactive species present in the process. Any diluent used should be free of impurities such as water, oxygen and carbon dioxide, and air and moisture should be removed from the polymerization reaction vessel.

The polymerization reaction can be carried out in the presence of a diluent. Suitable diluents include, for example, paraffins, cycloparaffins, and aromatic hydrocarbons, each having from 4 to 10 carbon atoms per molecule, and mixtures thereof.

The polymerization temperature for preparation of the A segment (the segment containing polymerized conjugated diene) of the block copolymers is in the range of about 0° C. to about 200° C., preferably 40° C. to about 125° C. The capping agent, if used, can be added at the polymerization temperature used for the A segment. The D segment (the polylactone segment) is polymerized at a temperature of about −20° C. to about 100° C., preferably about 0° C. to 70° C. For convenience, the pressure is maintained at a level sufficient to keep the polymerization reaction mixture substantially in the liquid phase. The time for polymerization of the monomers of each block of segment A can be from about 1 minute to about 100 hours, and the time for polymerization of the monomers of each block of segment D can be from about 1 minute to about 100 hours.

It is important that the combination of polymerization time and temperature for segment D be chosen so that conversion of monomer to polymer is essentially quantitative at the end of the chosen polymerization time. This is important because of the tendency of polylactones to undergo base-catalyzed degradation. In the presence of a base, polylactones or copolymers containing blocks of polylactones can undergo random chain scission to yield lactone oligomers or homopolymer. In the lactone polymerization process, a base is present throughout in the form of the organolithium initiator or the living polymer, which may have terminal —CH$_2$Li or —CH$_2$-O-Li groups. Because the degradation reactions must compete with the polymerization reaction for available lithium compound, and since polymerization kinetics are favored, degradation does not occur to a large extent until polymerization is complete. If polymerization is terminated before or immediately following quantitative conversion of lactone monomer to polymer, polylactone degradation is minimized.

Polymerization termination can be effected by adding water, an aqueous solution of a mineral acid, or a carboxylic acid to the polymerization mixture which, prior to termination, contains a polymer of the form A(D-Li)$_y$. It is currently believed that these agents do not promote chain scission because of the fact that lithium hydroxide, a product of termination using water, is soluble in water and is thus isolated from contact with the polymer, which is present in the hydrophobic organic phase, and that the lithium salt which is formed upon termination using a mineral acid or a carboxylic acid has a relatively low basicity. Termination of polylactone polymerization with an alcohol or a phenolic antioxidant in an alcohol can result in the presence of lithium alkoxide or lithium phenoxide or other substance which can induce chain scission and reduce the amount of polymerized lactone incorporated in the polymer.

As the point of quantitative conversion of lactone monomer to polymer cannot be determined by observation of the reaction mixture, this point must generally be determined for a given set of reaction conditions by determination of the percent conversion of all monomers to polymer and analysis of the resulting copolymer to determine the extent of incorporation and retention of the desired amount of lactone in the copolymer for a given lactone reaction time. A convenient method is to determine the extent of lactone incorporation indirectly, that is, by the compatibility of the copolymer with polyester, and to use lactone reaction times which produce copolymers which are most compatible with polyester. This can be done, for example, by terminating each of a set of identical polymerization mixtures at different times and then using the compatibility of the resulting polymers with polyester in vinyl monomer solution as a test of successful incorporation and retention of the desired amount of lactone in the block copolymer.

Polymerization termination is effected by adding water, an aqueous solution of a mineral acid, or a carboxylic acid to the polymerization mixture. The mineral acids and lower carboxylic acids are typically added as dilute aqueous solutions, for example as a 0.1 N solution, whereas the higher molecular weight, solid carboxylic acids are typically added without dilution to the polymer cement.

Suitable mineral acids include but are not limited to hydrochloric acid, sulfuric acid and phosphoric acid. The carboxylic acids are the aliphatic, alicyclic, aromatic, and heterocyclic di- and higher acids, and substituted derivatives thereof. Preferred carboxylic acids are the monocarboxylic acids having from about 2 to about 20 carbon atoms per molecule, such as acetic acid, benzoic acid, capric acid, lauric acid, and stearic acid.

Preferably, the amount of acid to be added is such that at least one equivalent weight of acid is added for each equivalent weight of organolithium initiator used to initiate the polymerization. It is within the scope of the invention to add excess acid although the amount added will not normally exceed about 5 equivalents by weight of acid per equivalent of organolithium initiator used.

The termination step can be conducted at the same temperature as the lactone polymerization step. To minimize polylactone block degradation, all polymer lithium should be terminated within the shortest time possible after addition of the terminating agent. For this reason it is desirable that good mixing of the reaction mixture be provided. The terminating agent can be added using any method taught in the art so long as it provides for quick addition of sufficient terminating agent to react with all of the polymer lithium in the polymerization reaction mixture.

Following termination of the polymerization reaction by the method described above, the copolymer can be isolated by conventional techniques such as coagulation with an excess of a non-solvent such as isopropyl alcohol or by steam stripping, followed by drying of the copolymer. Antioxidant can be added to the polymerization mixture after polymerization termination is complete and prior to polymer isolation and drying. Alternately or in addition, the isolated and dried block copolymer can be compounded in any conventional manner with antioxidants as well as other conventional rubber additives such as fillers, reinforcing agents, extenders, plasticizers, pigments, curing and vulcanizing agents, processing aids, retarders, antiozonants, inhibitors, UV stabilizers, dispersing agents, and lubricants.

Among unsaturated polyesters which are suitable for use in the composition of the invention are those prepared by reacting an unsaturated dicarboxylic acid having 4 to 12 carbon atoms such as maleic, fumaric, itaconic, citraconic, mesaconic, cis-2-dodecenedioic acid (or corresponding anhydrides or acid halides of these) and mixtures of these, with one or more polyols. Examples of polyols that can be used include alkylene glycols having 2 to 10 carbon atoms per molecule, dialkylene glycols having 4 to 18 carbon atoms per mole, glycerol, pentaerythritol, trimethylolpropane, trimethylpentanediol, trimethylpropanediol and hydrogenated bisphenol-A.

Up to one half or more on a molar basis of the unsaturated acid can be replaced by one or more saturated polycarboxylic acids having from 2 to 12 carbon atoms per molecule to modify the degree of unsaturation and reactivity of the polyester. Illustrative of these are oxalic acid, malonic acid, succinic acid, methylsuccinic acid, glutaric acid, adipic acid, suberic acid, sebacic acid, phthalic acid, isophthalic acid terephthalic acid, naphthalene dicarboxylic acid, cyclohexane dicarboxylic acid, tetrabromophthalic acid, chlorendic acid, citric acid and mixtures of these. The appropriate saturated and unsaturated acid anhydrides may be used and are usually preferred when available.

The proportion of polyhydric alcohols having more than two hydroxy groups and the proportion of polycarboxylic acids having more than two carboxy groups is preferably less than about 5 mole percent each based on total amount of polyol and polycarboxylic acid, so that the polyester produced has maximum esterification of the hydroxy and carboxy groups without being too viscous to compound readily.

The composition of the invention comprises a mixture of (1) the described copolymer of a lactone, a conjugated diene and, optionally, a monovinylarene, (2) an unsaturated polyester, and (3) a vinyl monomer having at least one ethylenically reactive group per molecule. Examples of suitable vinyl monomers include styrene, vinyltolene, divinylbenzene, 2-vinylpyridine, diallyl phthalate, triallyl isocyanurate, α-methylstyrene, alkyl acrylates and alkyl methacrylates in which the alkyl groups have from 1 to about 6 carbon atoms, and mixtures of these. The presently preferred vinyl monomer is sytrene because of its availability, reactivity, cost and desirable properties.

The weight ratio of unsaturated polyester to lactone copolymer generally ranges from about 15:1 to about 0.5:1, preferably from about 5:1 to 1:1. Total vinyl monomer from all sources is about 15 to about 300, preferably 30 to 200, parts by weight of vinyl monomer per 100 parts by weight unsaturated polyester plus lactone copolymer.

The composition of the invention can be mixed with other ingredients to give thermosettable compositions suitable for preparing reinforced plastic articles. Ingredients typically included in a thermosettable composition include a catalyst, reinforcing agents, thickeners, and fillers.

Among the suitable catalysts are free radical polymerization initiators selected from organic peroxides and hydroperoxides such as benzoyl peroxide, dicumyl peroxide, methyl ethyl ketone peroxide, lauryl peroxide, cyclohexane peroxide, t-butyl perbenzoate, t-butyl hydroperoxide, t-butylbenzene hydroperoxide, cumene hydroperoxide, and t-butyl peroctoate. Alternatively, azo compounds such as azobisisobutyronitrile can be used. A presently preferred catalyst is t-butyl perbenzoate. The catalyst is generally used in the range of about 0.1 to 10 parts by weight per 100 parts by weight unsaturated polyester plus lactone copolymer, preferably from about 1 to 5 parts by weight catalyst.

Reinforcing agents include fibers of glass, asbestos, carbon, graphite, metal, and synthetic polymers such as polyamides, polyesters, and polyolefins, and natural fibers such as cotton, jute, hemp, sisal, flax, wood, and paper. A presently preferred fiber is glass. The fibers can be used in the form of mats, fabrics, threads, and chopped fiber. The reinforcing agent is generally used in the range of about 20 to 300 parts by weight per 100 parts by weight unsaturated polyester plus lactone copolymer, preferably about 40 to 200 parts by weight reinforcing agent.

It is often desirable to add a thickening agent to the compositions of the invention. Such additives include oxides or hydroxides of a Group II metal such as magnesium, calcium, strontium, barium and zinc. These compounds are generally used in the range of about 0.2 to 20 parts by weight per 100 parts by weight of unsaturated polyester plus lactone copolymer, preferably about 1 to 10 parts by weight.

Fillers include large particle carbon black, glass microspheres, calcium carbonate, calcium silicate, talc, clay, alumina, aluminum hydoxide, antimony trioxide, silica, mica, barium sulfate, calcium sulfate, and mixtures of these. Presently preferred fillers include calcium carbonate, clay and talc because of their availability and cost. The quantity of filler, when used, is generally in the range of about 50 to 1000 parts by weight per 100 parts by weight unsaturated polyester plus lactone copolymer, preferably about 200 to 800 parts by weight filler.

Optional additives in addition to those previously named include pigments, colorants, lubricants, stabilizers, and silane coupling agents. Conventional colorants and pigments such as $TiO_2$, carbon black, and phthalocyanine pigments are used in amounts sufficient to give the desired color to the final molded product.

A lubricant such as the stearates of aluminum, barium, calcium, magnesium, or zinc in the range of about 0.2 to 20 parts by weight, preferably about 1 to 15 parts by weight, per 100 parts by weight unsaturated polyester plus lactone copolymer can be used to impart mold release properties to the compositions.

A stabilizer such as a barium or cadmium soap, a tin compound such as tin octanoate, a phosphite such as dimethyl phosphite or tris(nonylphenyl) phosphite, an alkyl phenol such as BHT, a quinone, and an amine can be used in an amount ranging from about 0.02 to 5 parts by weight per 100 parts by weight unsaturated polyester plus lactone copolymer.

The ingredients are mixed by a milling technique which involves moderate shear. This can be provided with twin-rotor mixers designed to give moderate shear to the paste-like ingredients. It is essential to provide some shear and, because of the viscosity of the materials being mixed, proper mixing cannot be obtained readily simply by stirring or by using a conventional impeller mixer. On the other hand, high intensity mixing which would generate excessive heat and activate the catalyst also should be avoided. Sheet molding compounding line mixing equipment can also be used. This mixing under sufficient shear to achieve good dispersion of the ingredients without heat buildup sufficient to activate the catalyst insures a good blend and is necessitated by the fact that the lactone copolymer is normally solid rather than liquid or semiliquid. Shear which is accompanied by a maximum temperature of no more than 30° C. is satisfactory.

Curing can be done at a temperature suitable for the particular catalyst used. Generally a temperature of 100° to 200° C. for 1 to 15 minutes in a press is sufficient.

For testing the compatibility of unsaturated polyesters and lactone copolymers of the invention, the lactone copolymer and the unsaturated polyester can be solution blended using a vinyl monomer having at least one ethylenically reactive group per molecule as solvent. Styrene is the generally preferred solvent. The lactone copolymer may be added to a solution of the unsaturated polyester in the vinyl monomer, or the unsaturated polyester may be added to a solution of lactone copolymer in the vinyl monomer. Alternately and preferably, separate solutions of lactone copolymer and unsaturated polyester, each in a vinyl monomer, may be mixed together. The latter method is convenient since the unsaturated polyesters are commercially available in the range of 50 to 75 weight percent solids dissolved in styrene or other vinyl monomer. The lactone copolymer unsaturated polyester liquid monomer mixture is mechanically stirred at a temperature less than 30° C. and then allowed to stand undisturbed in a capped container at room temperature. Periodic visual examination is made for phase separation.

EXAMPLE I

Styrene-butadiene-ε-caprolactone block terpolymers were prepared according to the procedure outlined below and evaluated for compatibility with unsaturated polyester resins in Example II.

TABLE I

| | Polymer | | | |
|---|---|---|---|---|
| | A | B | C | D |
| Step 1 | | | | |
| Styrene, parts by weight | 39 | 36 | 19 | 25 |
| Cyclohexane, parts by weight | 780 | 780 | 780 | 780 |
| Tetrahydrofuran, parts by weight | 0.05 | 0.05 | 0.05 | 0.05 |
| n-Butyllithium, mhm[a] | 1.2 | 1.9 | 2.0 | 1.4 |
| Polymerization temperature, °C. | 70 | 70 | 70 | 70 |
| Polymerization time, minutes | 30 | 20 | 20 | 20 |
| Step 2 | | | | |
| 1,3-Butadiene, parts by weight | 55 | 50 | 75 | 58 |
| Polymerization temperature, °C. | 70 | 70 | 70 | 70 |
| Polymerization time, minutes | 60 | 60 | 60 | 60 |
| Step 3 | | | | |
| Propylene oxide, mhm | 5 | 5 | 5 | 5 |
| Reaction temperature, °C. | 70→30 | 70→30 | 70→30 | 70→30 |
| Reaction time, minutes | 10 | 10 | 10 | 10 |
| Step 4 | | | | |
| ε-Caprolactone, parts by weight | 6 | 14 | 6 | 17 |
| Polymerization temperature, °C. | 30 | 30 | 30 | 30 |
| Polymerization time, minutes | 5 | 5 | 5 | 5 |

[a]mhm = gram millimoles per 100 grams of total monomer added in Steps 1, 2, and 4.

Cyclohexane was charged to a 26-oz. beverage bottle equipped with a perforated Crown cap over a self-sealing rubber gasket, and the bottle and cyclohexane were then purged with nitrogen. Styrene and tetrahydrofuran were added and then the n-butyllithium was added. The temperature was adjusted to 70° C. and the bottle and its contents were tumbled in a constant temperature bath for 20 to 30 minutes, after which time the styrene polymerization was essentially complete. 1,3-Butadiene was then charged to the bottle and the polymerization was continued for one hour with continued agitation at 70° C. At the end of this time, polymerization of the 1,3-butadiene was essentially complete. Propylene oxide was then added to the polymerization reaction mixture and the mixture was agitated for 10 minutes while the temperature was reduced from 70° C. to 30° C. Epsilon-caprolactone was added and polymerization was allowed to proceed at 30° C. for 5 minutes with continued agitation. Five minutes after the epsilon-caprolactone had been charged, the polymerization reaction was terminated by the addition of 10 ml of 0.1 M hydrochloric acid. After termination was complete, one part of 2,6-di-t-butyl-4-methylphenol per 100 parts of total monomers was added as a 10 weight percent solution in 50:50 toluene:isopropanol, the contents of the bottle were emptied into a beaker, and the styrene-butadiene-epsilon-caprolactone block terpolymer was isolated by steam stripping. The recovered polymer was dried at 60° C. for about 15 hours under reduced pressure. Properties of the recovered polymers are shown in Table II.

TABLE II

Properties of Caprolactone Block Terpolymers

| | Polymer | | | |
|---|---|---|---|---|
| | A | B | C | D |
| Molecular weight, $M_w{}^a$ | 53,000 | 64,000 | 84,000 | 76,000 |
| Molecular weight, $M_n{}^a$ | 42,000 | 50,000 | 72,000 | 65,000 |
| Inherent viscosity$^b$ | 0.51 | 0.53 | 0.75 | 0.66 |
| Block polycaprolactone, weight %$^c$ | 1.2 | 3.8 | 0.7 | 7.5 |

$^a$Molecular weights were determined from gel permeation chromatography curves by a procedure described by G. Kraus and C. J. Stacy, J. Poly. Sci. A-2 10, 657 (1972), and G. Kraus and C. J. Stacy, J. Poly. Sci. Symposium No. 43, 329 (1973).
$^b$Inherent viscosity was determined according to a procedure given in U.S. Pat. No. 3,278,508, column 20, Note a with the modification that the solution was not filtered through a sulfur absorption tube but rather a sample of the solution was filtered through a fritted glass filter stick of grade C porosity and pressured directly into the viscometer.
$^c$Determined by an oxidative degradation procedure wherein about 0.4 g of caprolactone copolymer is dissolved at 100–120° C. in about 35 ml of o-dichlorobenzene in an iodine flask equipped with an air condenser, 10 ml. of a 70 weight percent aqueous solution of t-butyl hydroperoxide and 1 ml. of 0.004 M osmium tetraoxide in o-dichlorobenzene are added, and the mixture maintained at 120 ± 5° C. for 15 minutes. The mixture is cooled to about room temperature and 300 ml of methyl alcohol added to precipitate the residual polymer. The mixture is allowed to stand undisturbed for about 48 hours to insure complete precipitation, and is then filtered through a fritted glass filter (medium) with a piece of Whatman No. 25 filter paper placed on top of the fritted glass. The collected precipitate is dried at 100° C. under reduced pressure for about 15 hours, and is then allowed to equilibrate in a desiccator at room temperature for at least one hour before weighing. Block polycaprolactone content is calculated from the weight of the precipitate and the carbonyl content as determined by infrared spectroscopy of a chloroform solution of the precipitate.

A second series of polymers was prepared generally according to Table I but on a larger scale, using a two-reactor system (20 gal. per reactor). Steps I, II and III were conducted in the first reactor and the reaction mixture was then pumped to the second reactor, which was maintained at 30° C. for the Step IV polymerization of the epilson-caprolactone. Stearic acid was used as the terminating agent instead of the aqueous 0.1 M hydrochloric acid, and the recovered polymers were stabilized with a mixture of 0.4 parts of 2,6-di-t-butyl-4-methylphenol and 0.53 parts of tris(nonylphenyl) phosphite per 100 parts of total monomers charged. Properties of these caprolactone terpolymers are shown in Table III.

TABLE III

Properties of Caprolactone Block Terpolymers Prepared on Larger Scale

| | E | F | C | H |
|---|---|---|---|---|
| Molecular weight, $M_n{}^a$ | 43,000 | 43,000 | 38,000 | 48,000 |
| Inherent viscosity$^c$ | 0.62 | 0.48,0.53$^b$ | 0.51 | 0.68,0.56$^b$ |
| Styrene/butadiene/caprolactone monomer charge, weight ratio | 10/85/5 | 34/52/14 | 38/56/6 | 14/75/11 |
| Block polycaprolactone, wt. %$^d$ | 2.0 | 10.3 | 3.7 | 7.1 |

$^a$Theoretical value calculated from monomer charge and initiator level employed.
$^b$Duplicate determinations.
$^c$See footnote b of Table II.
$^d$See footnote c of Table II.

EXAMPLE II

To test the stability of styrene solutions of unsaturated polyesters and the caprolactone terpolymers prepared in Example I, nine grams of the terpolymers dissolved in 21 grams of styrene and 30 grams of commercial unsaturated polyester resin (about 60 to 65% solids in styrene solution) were weighed into a four-ounce jar and the mixture was stirred for 15 minutes at low shear using a stainless steel, three-blade stirrer driven by an electric motor. The jar was then capped and the mixture was allowed to stand at room temperature. The mixture was examined visually for phase separation every hour during the first 8 hours, and then every 24 hours thereafter. Time to separation is defined as the time to the first indication of separation, and not the time to complete separation of the unsaturated polyester and the rubber. The results of the stability tests are given in Table IV.

TABLE IV

Stability of Rubber-Unsaturated Polyester Styrene Solutions

| | | Sty/Bd/CL$^b$ Monomer Charge, Weight % | Block Poly-Caprolactone Weight % | Time to Phase Separation In Commercial Unsaturated Polyester Resins | | | |
|---|---|---|---|---|---|---|---|
| Run No. | Polymer$^a$ | | | Rohm & Haas p-340$^d$ | Selectron RS 50239$^e$ | Koppers 3702-5$^f$ | Grace GR-13031$^g$ |
| 1 | Control$^h$ | 25/75/0 | — | <1 hr. | n.d.$^j$ | <1 hr. | <1 hr. |
| 2 | Control$^i$ | 15/85/0 | — | n.d. | <2 hrs. | <1 hr. | <1 hr. |
| 3 | A | 39/55/6 | 1.2 | n.d. | gel$^k$ | n.d. | n.d. |
| 4 | B | 36/50/14 | 3.8 | n.d. | >2 mo. | n.d. | n.d. |
| 5 | C | 19/75/6 | 0.7 | n.d. | <2 hrs.$^{l,m}$ | n.d. | n.d. |
| 6 | D | 25/58/17 | 7.5 | n.d. | <3 hrs.$^{l,m}$ | n.d. | n.d. |
| 7 | E | 10/85/5 | 2.0 | n.d. | 5 days | n.d. | n.d. |
| 8 | F | 34/52/14 | 10.3 | >2½ mo. | n.d. | >2½ mo. | >2½ mo. |
| 9 | G | 38/56/6 | 3.7 | >2½ mo. | n.d. | >2½ mo. | >2½ mo. |

TABLE IV-continued

| | | Sty/Bd/CL[b] Monomer Charge, | Block Poly- Caprolactone | Stability of Rubber-Unsaturated Polyester Styrene Solutions Time to Phase Separation In Commercial Unsaturated Polyester Resins | | | |
|---|---|---|---|---|---|---|---|
| Run No. | Polymer[a] | Weight % | Weight % | Rohm & Haas p-340[d] | Selectron RS 50239[e] | Koppers 3702-5[f] | Grace GR-13031[g] |
| 10 | H | 14/75/11 | 7.1 | <1 hr.[m] | n.d. | <1 hr.[m] | <1 hr.[m] |

[a]Polymer preparation and properties described in Example I.
[b]Sty = styrene; Bd = butadiene; CL = caprolactone.
[c]See footnote c, Table II of Example I.
[d]A highly reactive polyester resin containing 65.6 weight percent solids in styrene and made from glycols (7.3 moles propylene to 0.7 moles ethylene) and cis- and trans-butenedioic acid, containing a small amount of free butenedioic acid. This resin has a Brookfield viscosity of 1070 cps using RVF #2 spindle at 2 rpm, and a specific gravity at 25° C. of 1.114.
[e]An isophthalic acid-based polyester resin comprising 60-65 weight percent solids in styrene, PPG Industries.
[f]Unsaturated polyester resin from essentially a 0.9:1 mole ratio of fumaric acid:propylene glycol with some maleic acid units as indicated by nuclear magnetic resonance analysis.
[g]Unknown composition and structure.
[h]Solprene® 1205 rubber; butadiene-styrene block copolymer containing 25% total styrene of which about 18% is present as a polystyrene block.
[i]A styrene-butadiene block copolymer having a terminal carboxyl group attached to the butadiene block.
[j]n.d. = not determined.
[k]Stable gel-like emulsion.
[l]These samples were remixed after initially separating in the times shown, and took substantially longer to separate after the remixing.
[m]It is believed that during the initial mixing the mixture was allowed to heat up to a temperature greater than 30° C. It was found at a later time that phase separation was induced by temperatures above 30° C., but that the process was reversible and that remixing at a temperature below 30° C. of a sample that had previously been mixed above 30° C. and which had subsequently separated, often effectively produced a stable, or considerably more stable system than shown by the initial test.

Additional stability tests performed on other caprolactone terpolymers yielded some mixed results similar to those shown in Table IV. It is believed that at least some of the inconsistencies are the result of the variation in mixing temperatures described in footnotes k and l of Table IV.

Example II thus illustrates the improved compatibility and stability of compositions of caprolactone copolymers and unsaturated polyesters, as compared with unsaturated polyester compositions containing styrene-butadiene copolymers or carboxyl-terminated butadiene-styrene copolymers.

We claim:

1. A composition comprising:
   (a) a block copolymer of the form A(D)$_y$ wherein A is a polymer segment which comprises one or more polymer blocks formed at least in part from one or more conjugated diene monomers, D is a polymer segment which comprises one or more polymer blocks formed from one or more lactone monomers, and y is 1, 2, 3 or 4;
   (b) an unsaturated polyester; and
   (c) a vinyl monomer.

2. The composition of claim 1 wherein A is formed in part from one or more monovinylarene monomers.

3. The composition of claim 2 wherein the conjugated diene monomers are selected from the group of conjugated dienes having 4 to about 12, inclusive, carbon atoms per molecule, the monovinylarene monomers are selected from the group of monovinylarenes having 8 to about 12, inclusive, carbon atoms per molecule, and the lactone monomers are selected from the group of lactones represented by the formula

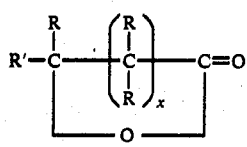

wherein each R is selected independently from the group consisting of hydrogen, alkyl, cycloalkyl, alkenyl, cycloalkenyl, aryl, alkaryl and aralkyl; R' is selected from the group consisting of R, hydrogen and a radical of the formula

and, when R' is the radical

no R is attached to the carbon atom to which the radical is attached; x is 1, 3 or 4; and the total number of carbon atoms in all the R and R' substituents does not exceed 12.

4. The composition of claim 3 wherein the conjugated diene is 1,3-butadiene, the monovinylarene is styrene, and the lactone is epsilon-caprolactone.

5. The composition of claim 4 wherein D constitutes about 2 to about 40 weight percent of A plus D.

6. The composition of claim 3 wherein y is 1.

7. The composition of claim 3 wherein y is 2.

8. The composition of claim 1 further comprising a catalyst.

9. The composition of claim 8 wherein the catalyst is t-butyl perbenzoate.

10. The composition of claim 8 further comprising a reinforcing agent.

11. The composition of claim 10 wherein the reinforcing agent comprises fibers of glass.

12. The composition of claim 10 further comprising at least one ingredient selected from the group consisting of stabilizers, lubricants, pigments, fillers and thickening agents.

13. The composition of claim 1 wherein A further comprises the residue of a capping agent.

14. The composition of claim 13 wherein the capping agent is propylene oxide.

15. The composition of claim 3 wherein y is 1, the conjugated diene is 1,3-butadiene, the monovinylarene is styrene, the lactone is epsilon-caprolactone, D constitutes about 2 to about 4 weight percent of A plus D, and the molecular weight of the block copolymer is within the range of about 35,000 to about 150,000.

16. A stable composition formed from a process comprising the steps of:
(a) providing a lithium-terminated polymer of the form A$(DLi)_y$ wherein A is a polymer segment comprising one or more polymer blocks formed at least in part from one or more conjugated diene monomers, D is a polymer segment comprising one or more polymer blocks formed from one or more lactone monomers, and y is 1, 2, 3, or 4;
(b) contacting the lithium-terminated polymer A(D-Li)$_y$ with a terminating agent selected from the group consisting of water, a mineral acid and a carboxylic acid, thus producing a block copolymer of the form A$(D)_y$; and
(c) mixing, in a vinyl monomer, the block copolymer of the form A$(D)_y$ and an unsaturated polyester.

17. The composition of claim 16 wherein A is formed in part from one or more monovinylarene monomers.

18. The composition of claim 17 wherein the conjugated diene monomers are selected from the group of conjugated dienes having 4 to about 12, inclusive, carbon atoms per molecule, the monovinylarene monomers are selected from the group of monovinylarenes having 8 to about 12, inclusive, carbon atoms per molecule, and the lactone monomers are selected from the group of lactones represented by the formula

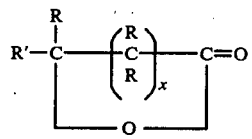

wherein each R is selected independently from the group consisting of hydrogen, alkyl, cycloalkyl, alkenyl, cycloalkenyl, aryl, alkaryl and aralkyl; R' is selected from the group consisting of R, hydrogen and a radical of the formula

and, when R' is the radical

no R is attached to the carbon atom to which the radical is attached; x is 1, 3 or 4; and the total number of carbon atoms in all the R and R' substituents does not exceed 12.

19. The composition of claim 18 wherein the conjugated diene is 1,3-butadiene, the monovinylarene is styrene, the lactone is epsilon-caprolactone, D constitutes about 2 to about 40 weight percent of A plus D, and the molecular weight of the block copolymer is within the range of about 35,000 to about 150,000.

20. The composition of claim 19 wherein y is 1.

21. The composition of claim 20 wherein the polymer of the form A$(D-Li)_y$ is formed by a process comprising
(1) polymerizing styrene in a hydrocarbon diluent at a temperature within the range of about 40° to about 125° C.;
(2) adding 1,3-butadiene monomer to the polystyrene-containing hydrocarbon diluent and allowing the 1,3-butadiene monomer to polymerize so as to form a lithium-terminated styrene-butadiene block copolymer;
(3) adding a capping agent to the hydrocarbon diluent containing the lithium-terminated styrene-butadiene block copolymer and allowing the capping agent to react therewith; and
(4) adding to the hydrocarbon diluent containing the capped copolymer an amount of epsilon-caprolactone monomer within the range of about 8 to about 50 weight percent based on the weight of the total monomers, and allowing the epsilon-caprolactone monomer to polymerize at a temperature within the range of about 0° to about 70° C.

22. The composition of claim 21 wherein the hydrocarbon diluent is cyclohexane, the initiator is n-butyllithium, and the capping agent is propylene oxide.

23. The composition of claim 22 wherein the lithium-terminated polymer of the form A$(D-Li)_y$ is contacted with the terminating agent at or before substantially quantative conversion of the epsilon-caprolactone monomer to polymer.

24. The composition of claim 23 wherein the terminating agent is water.

25. A process for preparing a composition comprising the steps of
(1) polymerizing styrene in a hydrocarbon diluent at a temperature of about 40° to about 125° C. using an initiator represented by the formula R''(Li)$_y$ wherein R'' is a hydrocarbon radical selected from aliphatic, cycloaliphatic and aromatic radicals and combinations thereof and y is an integer from 1 to 4;
(2) adding 1,3-butadiene monomer to the polystyrene-containing hydrocarbon diluent and allowing the 1,3-butadiene monomer to polymerize so as to form a lithium-terminated styrene-butadiene block copolymer;
(3) adding a capping agent to the hydrocarbon diluent containing the lithium terminated styrene-butadiene block copolymer and allowing the capping agent to react therewith;
(4) adding to the hydrocarbon diluent containing the capped copolymer an amount of epsilon-caprolactone monomer within the range of about 8 to about 50 weight percent based on the weight of the total monomers, and allowing the epsilon-caprolactone monomer to polymerize at a temperature within the range of about 0° to about 70° C.;
(5) contacting the thus-formed lithium-terminated styrene-butadiene-caprolactone block copolymer with a terminating agent selected from the group consisting of water, a mineral acid and a carboxylic acid;
(6) recovering the thus-formed block copolymer from the hydrocarbon diluent; and
(7) blending, in styrene solution, the block copolymer and an unsaturated polyester at a temperature less than 30° C. and in a weight ratio of unsaturated polyester to block copolymer of about 15:1 to about 0.5 to 1.

26. The method of claim 25 wherein the hydrocarbon diluent is cyclohexane, the initiator is n-butyllithium and the capping agent is propylene oxide.

27. The method of claim 26 wherein the terminating agent is water.

28. The method of claim 27 wherein the weight ratio of unsaturated polyester to block copolymer is about 5:1 to 1:1.

29. The method of claim 28 wherein the molecular weight of the block copolymer is about 35,000 to about 150,000.

* * * * *